(12) United States Patent
Megherhi et al.

(10) Patent No.: US 7,161,795 B1
(45) Date of Patent: Jan. 9, 2007

(54) COG DIELECTRIC COMPOSITION FOR USE WITH COPPER ELECTRODES

(75) Inventors: Mohammed H. Megherhi, Victor, NY (US); Walter J. Symes, Jr., Dundee, NY (US); Mike S. H. Chu, Lewiston, NY (US)

(73) Assignee: Ferro Corporation, Cleveland, OH (US)

( * ) Notice: Subject to any disclaimer, the term of this patent is extended or adjusted under 35 U.S.C. 154(b) by 17 days.

(21) Appl. No.: 11/235,656

(22) Filed: Sep. 26, 2005

(51) Int. Cl.
*H01G 4/06* (2006.01)
*C04B 35/46* (2006.01)

(52) U.S. Cl. .............. 361/321.5; 361/321.4; 501/139; 156/89.12

(58) Field of Classification Search .. 361/321.1–321.5, 361/311, 303–305; 501/139; 156/89.12
See application file for complete search history.

(56) References Cited

U.S. PATENT DOCUMENTS

| | | | | |
|---|---|---|---|---|
| 5,271,797 A | * | 12/1993 | Kamisawa | 216/87 |
| 5,571,767 A | | 11/1996 | Wilson et al. | |
| 5,599,757 A | | 2/1997 | Wilson et al. | |
| 5,783,165 A | | 7/1998 | Wilson et al. | |
| 5,818,686 A | * | 10/1998 | Mizuno et al. | 361/311 |
| 5,995,360 A | * | 11/1999 | Hata et al. | 361/321.5 |
| 6,185,087 B1 | | 2/2001 | Park et al. | |
| 6,245,433 B1 | * | 6/2001 | Nakamura et al. | 428/469 |
| 6,309,995 B1 | | 10/2001 | Maher et al. | |
| 6,610,241 B1 | | 8/2003 | Shrout et al. | |
| 6,631,070 B1 | | 10/2003 | Schmidt et al. | |
| 6,727,200 B1 | * | 4/2004 | Maher et al. | 501/139 |
| 6,828,266 B1 | | 12/2004 | Park et al. | |
| 2002/0122285 A1 | * | 9/2002 | Aoki et al. | 361/311 |
| 2003/0098434 A1 | | 5/2003 | Li et al. | |
| 2003/0147198 A1 | * | 8/2003 | Konaka et al. | 361/311 |
| 2004/0097034 A1 | * | 5/2004 | Sandhu et al. | 438/243 |
| 2004/0213730 A1 | | 10/2004 | Swanson | |
| 2004/0229746 A1 | | 11/2004 | Park et al. | |

* cited by examiner

*Primary Examiner*—Eric W. Thomas
(74) *Attorney, Agent, or Firm*—Rankin, Hill, Porter & Clark LLP

(57) ABSTRACT

Multilayer ceramic chip capacitors which satisfy COG requirements and which are compatible with reducing atmosphere sintering conditions so that non-noble metals such as copper and copper alloys thereof may be used for internal and external electrodes are made in accordance with the invention. The capacitors exhibit desirable dielectric properties (high capacitance, low dissipation factor, high insulation resistance), excellent performance on highly accelerated life testing, and very good resistance to dielectric breakdown. The dielectric layers comprise a composite oxide formed by calcining rare earth titanates, barium titanate, together with other metal oxides such as MgO, CaO, ZnO, $MnO_2$, $ZrO_2$, $SiO_2$, $Ga_2O_3$, $Nd_2O_3$, $Nb_2O_5$, and $Y_2O_3$.

19 Claims, 2 Drawing Sheets

Powder Calcined at 1025°C

Powder Calcined at 1000°C

Powder Calcined at 975°C

COG DIELECTRIC COMPOSITION FOR USE WITH COPPER ELECTRODES

BACKGROUND OF THE INVENTION

1. Field of Invention

This invention relates to a rare earth titanate-based dielectric composition, and more particularly to a rare earth titanate-based dielectric composition that can be used to form multilayer ceramic chip capacitors having internal base metal electrodes formed of copper or copper alloys.

2. Background of the Invention

Multilayer ceramic chip capacitors have been widely utilized as miniature-sized, high capacitance, and high reliability electronic components. In accordance with increasing demands for high-performance electronic equipment, multilayer ceramic chip capacitors also have encountered marketplace demand for smaller size, higher capacitance, lower cost, and higher reliability.

Multilayer ceramic chip capacitors generally are fabricated by forming alternating layers of an internal electrode forming paste and a dielectric layer-forming paste. Such layers are typically formed by sheeting, printing, or similar techniques, followed by concurrent firing.

Generally, the internal electrodes have been formed of conductors such as palladium, gold, silver or alloys of the foregoing. Although palladium, gold and silver are expensive, they can be partially replaced by the use of relatively inexpensive base metals such as copper and its alloys. A "base metal" is a conductive metal other than gold, silver, palladium, and platinum. Base metal internal electrodes can become oxidized if fired in ambient air, so the dielectric layers and internal electrode layers must be co-fired in a reducing atmosphere. Firing in a reducing atmosphere, however, causes the dielectric layers to be reduced, which decreases resistivity. Multilayer ceramic chip capacitors using non-reducible dielectric materials have been proposed, however, such devices typically have a shorter life of insulation resistance (IR) and low reliability.

The Electronic Industry Association (EIA) prescribes a standard for the temperature coefficient of capacitance (TCC) known as the COG characteristic. The COG characteristic requires that the change of capacitance be no greater than 30 ppm per degree centigrade (30 ppm/° C.) when C>20 pF and within the limit of +120 ppm/° C. and −40 ppm/° C. when C≦20 pF over the temperature range −55° C. to +125° C. COG components do not exhibit any capacitance aging.

SUMMARY OF THE INVENTION

The present invention provides a dielectric composition that can be used to make ceramic multilayer capacitors compatible with internal electrodes containing base metals such as copper or copper alloys. Capacitors may be formed from the dielectric composition of the present invention to exhibit a high dielectric constant (K) with a small dielectric loss and excellent reliability under highly accelerated life testing conditions.

The dielectric composition of the present invention comprises a uniform dense microstructure of grains having an average diameter of about 3–4 microns. A uniform and dense grain microstructure is critical in achieving high reliability multilayer capacitors having dielectric layers thinner than 5 microns.

In one embodiment, the invention provides a method of forming an electronic component comprising applying particles of a dielectric material to a substrate and firing the substrate at a temperature sufficient to sinter the dielectric material, wherein the dielectric material comprises, prior to firing, about 12 to about 15 wt % $Gd_2O_3$, about 18 to about 22.5 wt % $Nd_2O_3$, about 26 to about 40 wt % $TiO_2$, about 12 to about 16 wt % BaO, about 0.05 to about 3 wt % CaO, about 0.05 to about 1.5 wt % SrO, about 0.05 to about 1.5 wt % $SiO_2$, about 0.05 to about 1 wt % $Li_2O$, about 2.5 to about 4.5 wt % $Sm_2O_3$, about 0.1 to about 5 wt % ZnO, about 0.05 to about 3 wt % $B_2O_3$, and about 0.05 to about 1.5 wt % LiF. The limits of each range in this and other formulations herein are considered to be preceded by the modifier "about."

A further embodiment of the invention provides a method of forming an electronic component comprising alternately printing layers of an oxide-containing dielectric material and layers of a metal-containing electrode paste onto a substrate to form a laminar stack, wherein the dielectric material comprises, prior to firing, about 12 to about 15 wt % $Gd_2O_3$, about 18 to about 22.5 wt % $Nd_2O_3$, about 26 to about 40 wt % $TiO_2$, about 12 to about 16 wt % BaO, about 0.05 to about 3 wt % CaO, about 0.05 to about 1.5 wt % SrO, about 0.05 to about 1.5 wt % $SiO_2$, about 0.05 to about 1 wt % $Li_2O$, about 2.5 to about 4.5 wt % $Sm_2O_3$, about 0.1 to about 5 wt % ZnO, about 0.05 to about 3 wt % $B_2O_3$, and about 0.05 to about 1.5 wt % LiF. The laminar stack is cut to a predetermined shape, separated from the substrate, and fired to densify the metal in the electrode and sinter the oxides in the dielectric material.

The invention also provides an electronic device comprising a multilayer chip capacitor comprising a dielectric layer comprising a composite oxide comprising Gd, Nd, Ti, Ba, Ca, Sr, Si, Li, Sn, Zn, B, and F.

Further embodiments include the multilayer ceramic chip capacitors and electronic components made with such capacitors made by the above-mentioned processes.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Multilayer chip capacitors are fabricated by alternately stacking dielectric layers and internal electrode layers to form green chips. The internal electrodes of interest herein are comprised of base metals including copper or copper alloys. The dielectric composition that forms the dielectric layers is produced by wet milling the components of the dielectric with an organic vehicle system. The dielectric composition is deposited on a carrier film, such as polyester, polypropylene, or a belt, such as stainless steel, paper, or a substrate such as alumina, or glass, coating the film and forming sheets, which are alternately stacked with electrodes to form the green chips.

After the green chips are formed, the organic vehicle is removed by heating to a temperature of less than about 350° C. in an air atmosphere. Once the vehicle is removed, the green chips are then fired in a reducing atmosphere of wet nitrogen and hydrogen having an oxygen partial pressure of about $10^{-12}$ to about $10^{-8}$ atm, at a temperature of about 950° C. to about 1050° C. Various heating profiles may be used both for removing the binder and for firing the chip.

Figure 1:
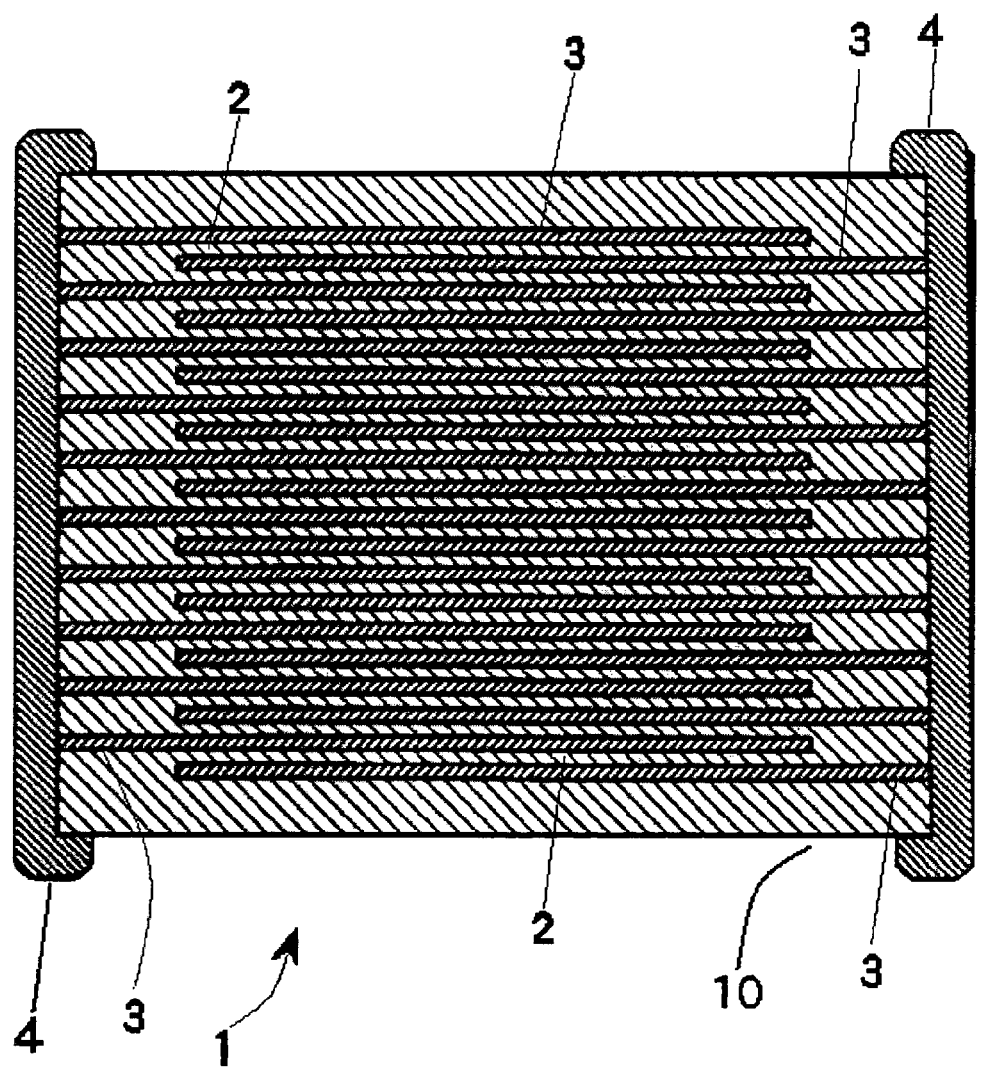
FIG. 1 is a cross-sectional view of a multilayer ceramic chip capacitor according to an embodiment of the invention.

The configuration of multilayer ceramic capacitors is well known in the art. With reference to FIG. 1, an exemplary structure of a multilayer ceramic capacitor 1 is shown. Conductive end terminations 4 of the capacitor 1 are disposed on side surfaces of the capacitor chip (or body) 10 and in electrical connection with internal conductive electrode layers 3. The capacitor chip 10 has a plurality of alternately stacked dielectric layers 2. The shape of the capacitor chip 10 is not critical although it is often rectangular shaped. Also, the size is not critical and the chip may have appropriate dimensions in accordance with a particular application, typically in the range of 1.0 to 7.0 mm×0.5 to 5.0 mm×0.5 to 2.0 mm. The internal electrode layers 3 are stacked such that at opposite ends they are alternately exposed at opposite side surfaces of the chip 10. That is, the internal electrode layers 3 of one group are exposed at one side surface of the chip 10 and the internal electrode layers 3 of another group are exposed at the opposite side surface of the chip 10. One end termination 4 is applied to one side chip of the capacitor chip 10 in electrical contact with the internal electrode layers 3 of the one group, and the other end termination 4 is applied to the opposite side surface of the chip 10 in electrical contact with the internal electrode layers 3 of the other group.

A further embodiment of the invention is an electronic device comprising a multilayer chip capacitor comprising a dielectric layer comprising a composite oxide comprising Gd, Nd, Ti, Ba, Ca, Sr, Si, Li, Sn, Zn, B, and F.

The dielectric layers are formed of a dielectric material formed by sintering a blend including oxides of gadolinium, neodymium, titanium, barium, calcium, strontium, silicon, lithium, samarium, zinc, boron, as well as a source of fluoride ion. With reference to Table 1, the dielectric composition comprises, prior to firing, the "broad" formulation, preferably, the "intermediate" formulation, and more preferably, the "narrow" formulation.

TABLE 1

Oxide formulations of dielectric compositions, prior to firing.

|  | Broad | Intermediate | Narrow |
| --- | --- | --- | --- |
| $Gd_2O_3$ | 12–15 | 12.5–14.5 | 13–14 |
| $Nd_2O_3$ | 18–22.5 | 19–22 | 20–21 |
| $TiO_2$ | 26–40 | 30–39 | 32–38 |
| BaO | 12–16 | 13–15 | 14–15 |
| CaO | 0.05–3 | 0.1–2.5 | 1–2.5 |
| SrO | 0.05–1.5 | 0.1–1 | 0.5–1 |
| $SiO_2$ | 0.05–1.5 | 0.1–1 | 0.5–1 |
| $Li_2O$ | 0.05–1 | 0.1–.8 | 0.2–0.5 |
| $Sm_2O_3$ | 2.5–4.5 | 3–4 | 3.2–3.8 |
| ZnO | 0.1–5 | 0.2–4.5 | 1–4 |

TABLE 1-continued

Oxide formulations of dielectric compositions, prior to firing.

|  | Broad | Intermediate | Narrow |
| --- | --- | --- | --- |
| $B_2O_3$ | 0.05–3 | 0.1–2.5 | 0.5–2 |
| LiF | 0.05–1.5 | 0.1–1 | 0.3–.9 |

In one embodiment, the dielectric composition of the present invention comprises, prior to firing, a blend of the oxides of gadolinium, neodymium, barium, calcium, titanium, zinc, silicon, strontium, lithium, samarium, and boron, as well as fluoride ions. Another route is to begin with gadolinium carbonate, neodymium carbonate, barium carbonate, calcium carbonate, strontium carbonate, lithium carbonate, and samarium carbonate as well as the oxides of titanium, zinc, silicon and boron. The composition can also be made by firing a blend of one or more of the aforementioned oxides with one or more of the following pre-reacted titanates: barium titanate, neodymium titanate, calcium titanate, and strontium titanate. It should be evident for those who are familiar with the art that the above mentioned oxides in their hydroxide or other forms can also be used so long as the final dielectric composition has the same oxide proportions.

Other compounds may be present in the dielectric material provided that the other compound does not adversely affect dielectric properties. Such compounds are usually found in the raw materials as impurities.

The dielectric compositions herein possess fine crystal grains that typically have a mean size of about 3 to about 4 microns, with a grain size of about 3 microns being preferred.

Each dielectric layer has a thickness of up to about 50 microns. Preferably, the thickness of each dielectric layer is from about 0.5 to about 50 microns. More preferably, the thickness of each dielectric layer is from about 2 microns to about 10 microns. The compositions herein may be employed to make multilayer ceramic chip capacitors having thin dielectric layers to ensure minimal degradation of capacitance over the service life. The number of dielectric layers stacked in a chip capacitor is generally from about 2 to about 800, and more preferably from about 3 to about 400.

The multilayer ceramic chip capacitor of the present invention generally is fabricated by forming a green chip by conventional printing and sheeting methods using pastes, and firing the chip. After firing, the chip is tumbled dry in a medium such as alumina or silica to round off corners. A conductive paste, containing copper, for example, is then applied to both ends to connect the exposed inner electrodes together to make terminations. The chip is then termination fired at about 600° C. to about 800° C. in a dry nitrogen atmosphere ($pO_2$ from about $10^{-6}$ to about $10^{-5}$ atm) for about 10 minutes to about 2 hours to sinter the conductor (e.g., copper) into a solid conduction pad at both ends, to form a multilayer capacitor. The terminations are external electrodes 4 as shown in FIG. 1.

Dielectric Pastes. A paste for forming the dielectric layers can be obtained by mixing an organic vehicle with a raw dielectric material, as disclosed herein. Also useful are precursor compounds that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material is generally used in powder form having a mean particle size of about 0.1 to about 3 microns, and more preferably about 1 micron or less.

Organic Vehicle. The organic vehicle is a binder in an organic solvent. The binder used herein is not critical; conventional binders such as ethyl cellulose, polyvinyl butanol, ethyl cellulose, and hydroxypropyl cellulose, and combinations thereof are appropriate. The organic solvent is also not critical and may be selected in accordance with a particular application method (i.e., printing or sheeting), from conventional organic solvents such as terpineol, butyl carbitol, acetone, toluene, ethanol, diethylene glycol butyl ether; 2,2,4-trimethyl pentanediol monoisobutyrate (Texanol®); alpha-terpineol; beta-terpineol; gamma terpineol; tridecyl alcohol; diethylene glycol ethyl ether (Carbitol®), diethylene glycol butyl ether (Butyl Carbitol®), and propylene glycol; and blends thereof. Products sold under the Texanol® trademark are available from Eastman Chemical Company, Kingsport, Tenn.; those sold under the Dowanol® and Carbitol® trademarks are available from Dow Chemical Co., Midland, Mich.

No particular limit is imposed on the organic vehicle content of the respective pastes (dielectric or electrode pastes). Often the paste contains about 1 to 5 wt % of the binder and about 10 to 50 wt % of the organic solvent, with the balance being either the metal component (for an electrode) or a dielectric component (for a dielectric layer). If desired, the respective pastes may contain up to about 10 wt % of other additives such as dispersants, plasticizers, and insulating compounds.

Internal Electrode. A paste for forming internal electrode layers is obtained by mixing a conductive material with an organic vehicle. The conductive material used herein includes conductive metals and alloys as mentioned above and various compounds which convert into such conductive metals upon firing, for example, oxides, organometallic compounds and resinates. An example of a suitable copper paste is TM50-081 copper paste from Ferro Corporation.

With reference to FIG. 1, the conductor that forms the internal electrode layers 3 is not critical, although a base metal preferably is used since the dielectric material of the dielectric layers 2 has anti-reducing properties. Typical base metals are copper and its alloys. Preferred copper alloys contain at least one other metal selected from Mn, Cr, Co, Ni, and Al. Alloys containing at least about 95 wt % of copper are preferred. It is to be noted that copper and copper alloys may contain up to about 0.1 wt % of phosphorous and other trace components (i.e., impurities). The thickness of the internal electrode layers may be determined to suit a particular application, but the layers are typically up to about 5 microns thick. Preferably, an internal electrode layer has a thickness of about 0.5 to about 5 microns and more preferably about 1 to about 5 microns.

External Electrode. The conductor that forms the external electrodes 4 is not critical, although inexpensive metals such as copper, copper, and alloys thereof, optionally containing Mn, Cr, Co, Cu or Al, are preferred. The thickness of the external electrode layers may be determined to suit a particular application, but the layers are typically up about 10 to about 50 microns thick, preferably about 20 to about 40 microns thick. Paste for forming external electrodes is prepared by the same method as for the internal electrodes.

A green chip then may be prepared from the dielectric layer-forming paste and the internal electrode layer-forming paste. In the case of a printing method, a green chip is prepared by alternately printing the pastes onto a substrate of a polyester film, (e.g., polyethylene terephthalate (PET)), in laminar form, cutting the laminar stack to a predetermined shape and separating it from the substrate. Also useful is a sheeting method wherein a green chip is prepared by forming green sheets from the dielectric layer-forming paste, printing the internal electrode layer-forming paste on the respective green sheets, and stacking the printed green sheets. After the organic vehicle is removed from the green chip, it is fired. The organic vehicle may be removed under conventional conditions, by heating at a rate of 0.01° C. to 20° C./hour, more preferably about 0.03–0.1° C./hour, with a hold temperature of about 150° C.–350° C., more preferably about 250° C., and a hold time of about 30–700 minutes, more preferably about 200–300 minutes in an air atmosphere.

The green chip is then fired in an atmosphere, which is determined according to the type of conductor in the internal electrode layer-forming paste. Where the internal electrode layers are formed of a base metal conductor such as copper and copper alloys, the firing atmosphere may have an oxygen partial pressure of $10^{-12}$ to $10^{-8}$ atm. Sintering at an oxygen partial pressure lower than $10^{-12}$ atm should be avoided, since at such low pressures the conductor can be abnormally sintered and may become disconnected from the dielectric layers. At oxygen partial pressures above about $10^{-8}$ atm, the internal electrode layers may be oxidized. Oxygen partial pressures of about $10^{-11}$ to $10^{-9}$ atm are most preferred.

For firing, the temperature is raised from room temperature to a peak temperature of from about 900° C. to about 1050° C., more preferably from about 950° C. to about 1050° C. The temperature is held for about two hours to enhance densification. Lower hold temperatures provide insufficient densification whereas higher hold temperatures can lead to very large grains. The firing is preferably conducted in a reducing atmosphere. An exemplary firing atmosphere includes wet $N_2$, or a humidified mixture of $N_2$ and $H_2$ gases. Remaining conditions for sintering preferably are a ramp rate of about 50° C. to 500° C./hour, more preferably about 200° C. to 300° C./hour; hold temperature of about 900° C. to about 1050° C., preferably about 950° C. to about 1025° C., more preferably about 950° C. to about 1050° C.; hold time: about 0.5 to about 8 hours, more preferably about 1 to 3 hours; cooling rate: 50° C. to 500° C./hour, more preferably 200° C. to 300° C./hour.

The organic vehicle removal and firing may be carried out either continuously or separately. If continuously, the process includes organic vehicle removal, changing the atmosphere without cooling, raising the temperature to the firing temperature, holding at that temperature for a specified time and cooling afterwards. If separately, after organic vehicle removal and cooling down, the temperature of the chip is raised to the sintering temperature and the atmosphere then is changed to a reducing atmosphere.

If necessary, pads are formed on the external electrodes by plating or other methods known in the art. The multilayer ceramic chip capacitors of the invention can be mounted on printed circuit boards, for example, by soldering.

It has been found that the multilayer ceramic capacitors of the present invention exhibit a very high dielectric constant meeting COG criteria and perform well in highly accelerated life testing conditions, and also exhibit a high breakdown voltage in a DC field. Under the highly stressed conditions consisting of an applied DC field of 15 volts/micron and 140° C. the ceramic capacitors demonstrate a characteristic life up to 100 hours. The dielectric constant is greater than 65 and the dissipation factor (DF) is less than 0.1% at 25°

C. when measured at 1 MHz and 1 volt root mean square. The temperature coefficient of capacitance is within ±30 ppm/° C. of the value at the reference temperature, 25° C., over the temperature range of −55° C. to +125° C. The following examples are provided to illustrate preferred aspects of the invention and are not intended to limit the scope of the invention.

EXAMPLE 1

A dielectric composition identified as Precursor 1 was formed by mixing, blending, and/or milling in water appropriate amounts of the oxides as shown in Table 2. The powders were mixed at high shear (~5000/min) with 1% Darvan® C, a polymeric deflocculant available from RT Vanderbilt Co, Inc, Norwalk, Conn. The mixed powders were bead milled to a particle $D_{50}$ of about 0.64 microns using 0.5 mm YTZ (yttria stabilized zirconia). The powders were calcined at 975° C. for 5 hours. The calcined powders are then pulverized by conventional means to afford Precursor 1.

TABLE 2

Oxide ingredients of Precursor 1 prior to calcination.

| Oxide | Wt % |
|---|---|
| $Gd_2O_3$ | 13.489 |
| $Nd_2O_3$ | 19.875 |
| $TiO_2$ | 37.633 |
| $BaCO3$ | 18.860 |
| $CaCO_3$ | 3.787 |
| $SrCO_3$ | 1.226 |
| $SiO_2$ | 0.895 |
| $Li_2CO_3$ | 0.740 |
| $Sm_2O_3$ | 3.495 |
| Total | 100.000 |

Alternately, the composition of Precursor 1 can be represented by the following expression: 84.8 parts of $Ba_{0.965}Ca_{0.209}Sr_{0.084}Nd_{1.192}Gd_{0.752}Ti_{4.177}Si_{0.15}O_{12.829}$+9.42 parts of (0.3 $CaTiO_3$-0.7 $Li_{0.5}Sm_{0.5}TiO_3$). To the Precursor 1 were added $2ZnO.3B_2O_3$, ZnO, and LiF, as a sintering flux, in accordance with the formulation in Table 3. Again, the blended powders are mixed at high shear (~5000/min), bead milled to a particle $D_{50}$ of about 0.64 microns using 0.5 mm YTZ (yttria stabilized zirconia), dried and pulverized by conventional means to afford the dielectric powder of Example 1.

TABLE 3

Formulation of Example 1 dielectric powder prior to firing.

| Oxide | Wt % |
|---|---|
| Precursor 1 | 94.220 |
| ZnO | 2.580 |
| $2ZnO.3B_2O_3$ | 2.500 |
| LiF | 0.700 |
| Total | 100.000 |

The powder of Example 1 has a formula that may be expressed alternately as: 84.8 wt % $Ba_{0.965}Ca_{0.209}Sr_{0.084}Nd_{1.192}Gd_{0.752}Ti_{4.177}Si_{0.15}O_{12.829}$+9.42 wt % (0.3 $CaTiO_3$-0.7 $Li_{0.5}Sm_{0.5}TiO_3$)+2.50 wt % $2ZnO.3B_2O_3$+2.58 wt % ZnO+0.70 wt % LiF. The powder of Example 1 contains the combination of simple oxides as set forth in Table 4.

TABLE 4

Oxide ingredients of Example 1 dielectric powder, prior to firing.

| Oxide | Wt % | Mol % |
|---|---|---|
| $Gd_2O_3$ | 13.619 | 4.602 |
| $Nd_2O_3$ | 20.065 | 7.305 |
| $TiO_2$ | 37.992 | 58.245 |
| BaO | 14.795 | 9.184 |
| CaO | 2.142 | 4.679 |
| SrO | 0.869 | 1.027 |
| $SiO_2$ | 0.903 | 1.842 |
| $Li_2O$ | 0.302 | 0.562 |
| $Sm_2O_3$ | 3.258 | 1.239 |
| ZnO | 3.675 | 5.531 |
| $B_2O_3$ | 1.410 | 2.480 |
| LiF | 0.700 | 3.305 |
| Total | 100.000 | 100.000 |

The final powders had an average particle size of 0.5 to 1 micron. One hundred grams of the above powders was then added to 28.8 grams of an organic vehicle comprising polyvinyl butanol, toluene, and ethanol, and wet milled for 24 hours to prepare a slurry for tape casting. The wet slurry was coated on a polyester film to form dielectric green tapes. The thickness of the dielectric green tapes was from about 5 to about 15 microns depending on the specific testing to be performed on them. Copper electrodes were printed onto the dried green dielectric tape by conventional screen-printing methods using a conventional copper paste. A total of 10 sheets were stacked and bonded under a pressure of 5100 psi (~347 atmospheres) and a temperature of 130° F. to form a green chip. After dicing to a suitable dimension so that, after sintering and shrinkage, (which is typically from 15% to 20% in both X and Y directions), the chip dimension was about 2.1 mm (L)×1.3 mm (W) (EIA0805 size), the green chip was heated to remove the organic vehicle accordance with the burn-out cycle of Table 5.

TABLE 5

Binder removal conditions.

| Stage | Temp (° C.) | Duration (min) | Atmosphere |
|---|---|---|---|
| Ramp | 325 | 1200 | Air |
| Soak | 325 | 240 | Air |
| Cool | 25 | to reach 25° C. | Air |

Upon cooling to room temperature, the chips using the powder of Table 4 (Example 1) are fired under the conditions set forth in Table 6 in a Tokai Konetsu Kogyo batch kiln, to obtain a multilayer capacitor chip.

TABLE 6

Example 1 Firing conditions.

| Stage | Temp | Time | Dew Point | $N_2$ flow | Firing Atm |
|---|---|---|---|---|---|
| Ramp | 1000° C. | 3 hours | 35° C. | 40 L/min | Varies* |
| Soak | 1000 | 2 | 35 | 50 | $10^{-9}$ atm $O_2$ |
| Cool | 25 | 6 | $H_2O$ off | 40 | 7 ppm $O_2$ |

*The atmosphere during temperature ramp varies due to carbon burn off.

EXAMPLE 2

A dielectric powder was prepared following in all respects the ingredients and procedures of Example 1. The only difference is that the calcination of the powder in Example 2 was performed at 1000° C.

EXAMPLE 3

A dielectric powder was prepared following in all respects the ingredients and procedures of Example 1. The only difference is that the calcination of the powder in Example 3 was performed at 1025° C.

EXAMPLE 4

A dielectric composition identified as Precursor 2 was formed by mixing, blending, and/or milling in water appropriate amounts of the oxides as shown in Table 7. The powders were prepared according to the procedures of Example 1, however calcined at 1050° C.

TABLE 7

Oxide ingredients of Precursor 2 prior to calcination.

| Oxide | Wt % |
|---|---|
| $Li_2CO_3$ | 7.031 |
| $Sm_2O_3$ | 33.192 |
| $CaCO_3$ | 16.328 |
| $TiO_2$ | 43.448 |
| Total | 100.000 |

Alternately, the composition of Precursor 2 can be represented by the following expression: $0.3\ CaTiO_3\text{-}0.7\ Li_{0.5}Sm_{0.5}TiO_3$.

A dielectric composition identified as Precursor 3 was formed by mixing, blending, and/or milling in water appropriate amounts of the oxides as shown in Table 8. The powders were prepared exactly as in Example 1, however calcined at 1050° C.

TABLE 8

Oxide ingredients of Precursor 3 prior to calcination.

| Oxide | Wt % |
|---|---|
| $Gd_2O_3$ | 15.077 |
| $Nd_2O_3$ | 22.213 |
| $TiO_2$ | 36.948 |
| $BaCO_3$ | 21.080 |
| $CaCO_3$ | 2.315 |
| $SrCO_3$ | 1.370 |
| $SiO_2$ | 1.000 |
| Total | 100.000 |

Alternately, the composition of Precursor 3 can be represented by the following expression: $Ba_{0.965}Ca_{0.209}Sr_{0.084}Nd_{1.192}Gd_{0.752}Ti_{4.177}Si_{0.15}O_{12.829}$.

To Precursors 2 and 3, were added $2ZnO.3\ B_2O_3$, ZnO, and LiF, as a sintering flux, in accordance with the formulation in Table 9. Again, the blended powders are mixed at high shear (~5000/min), bead milled to a particle $D_{50}$ of about 0.64 microns using 0.5 mm YTZ (yttria stabilized zirconia), dried and pulverized by conventional means to afford the dielectric powder of Example 4.

TABLE 9

Formulation of Example 4 dielectric powder prior to firing.

| Oxide | Wt % |
|---|---|
| Precursor 2 | 9.420 |
| Precursor 3 | 84.800 |
| ZnO | 2.580 |
| $2ZnO.3B_2O_3$ | 2.500 |
| LiF | 0.700 |
| Total | 100.000 |

The powder of Example 4 has a formula that may be expressed alternately as: 84.8 wt % $Ba_{0.965}Ca_{0.209}Sr_{0.084}Nd_{1.192}Gd_{0.752}Ti_{4.177}Si_{0.15}O_{12.829}$+9.42 wt % ($0.3\ CaTiO_3$-$0.7\ Li_{0.5}Sm_{0.5}TiO_3$)+2.50 wt % $2ZnO.3\ B_2O_3$+2.58 wt % ZnO+0.70 wt % LiF, which is identical to the powder of Example 1.

Multilayer chip capacitors were made from the powders of Examples 1, 2, 3, and 4 and tested. Examples 4a–4e were made with the powder of Example 4, with the difference among them being only the firing temperature and/or the firing atmosphere. For all four examples, chips had first their binder removed at a temperature of about 325° C. and then sintered at a temperature from 975° C. to 1050° C. in a gas mixture of $N_2/H_2/H_2O$ at a $pO_2$ from $10^{-11}$ to $10^{-8}$ atm. The gas mixture was achieved by humidifying the $N_2/H_2$ gases through a wetter with a water temperature of 35° C. The chip thus obtained was corner rounded by tumbling. An external electrode forming copper paste commercially available as TM50-081 from Ferro Corporation of Cleveland, Ohio was applied to the end faces and fired in a dry nitrogen atmosphere at 775° C. for about 70 minutes to form external electrodes. The multilayer capacitors thus produced had dimensions of about 2.1 mm×1.3 mm (EIA0805 size) with a total thickness of about 0.7 mm. Each of the 10 active dielectric layers was about 16 to 18 microns thick, as presented in Table 10, and each internal nickel electrode layer was about 1.5 microns thick. Stacked above and below the outermost active layers were 15 "blank" layers of dielectric material to build the chip up to the overall thickness of about 700 microns.

Figure 4:
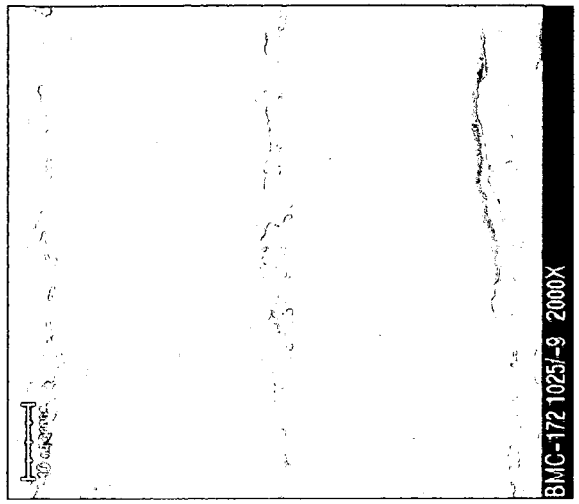
FIG. 4 is a photomicrograph of a cross-sectional view of a multilayer ceramic chip capacitor according to Example 3 of the invention.
Figure 3:
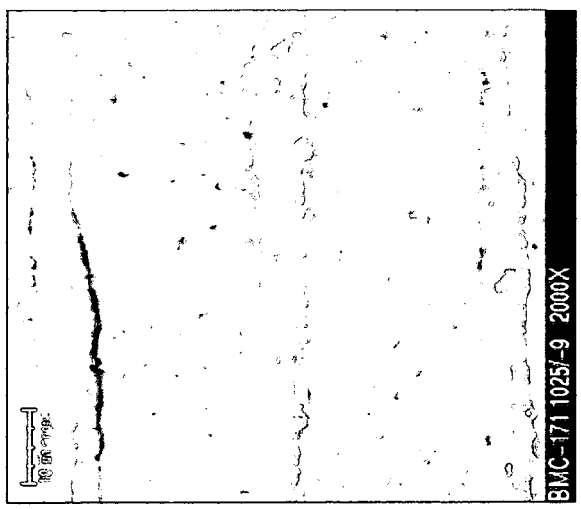
FIG. 3 is a photomicrograph of a cross-sectional view of a multilayer ceramic chip capacitor according to Example 2 of the invention.
Figure 2:
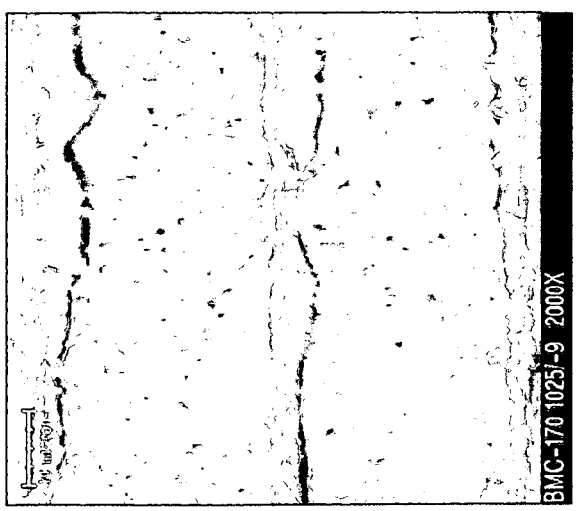
FIG. 2 is a photomicrograph of a cross-sectional view of a multilayer ceramic chip capacitor according to Example 1 of the invention.

Firing conditions as well as electrical properties are summarized in Table 10. The exemplary capacitors are made from the compositions of Examples 1, 2, 3, and 4 each have a very high dielectric constant, low DF, low aging rate, small fired grain size, and high breakdown voltage. The TCC meets the COG standard and the RC at 25° C., 85° C., and 125° C. All exceed EIA specifications. FIGS. 2–4 provide a photomicrograph at a magnification of 2000×, of a cross-sectional view of a multilayer ceramic chip capacitor according to Examples 1–3 in Table 10.

TABLE 10

Firing conditions, electrical properties, life testing for MLCCs of Examples 1–4.

| Example | 1 | 2 | 3 | 4a | 4b | 4c | 4d | 4e |
|---|---|---|---|---|---|---|---|---|
| calcine temp (° C.) | 975 | 1000 | 1025 | 1050 | 1050 | 1050 | 1050 | 1050 |
| firing temp (° C.) | 1025 | 1025 | 1025 | 1000 | 1000 | 1000 | 1000 | 1025 |
| firing pO$_2$ (atm) | $10^{-9}$ | $10^{-9}$ | $10^{-9}$ | $10^{-8}$ | $10^{-9}$ | $10^{-10}$ | $10^{-11}$ | $10^{-10}$ |
| Capacitance (pF) | 289 | 312 | 342 | 299 | 290 | 333 | 340 | 334 |
| DF (%) | 0.519 | 0.021 | 0.015 | 0.042 | 0.049 | 0.032 | 0.028 | 0.051 |
| Dielectric Layer Thickness (microns) | 17.2 | 15.9 | 16.0 | 17.4 | 17.2 | 17.3 | 17.4 | 17.5 |
| Calculated K | 87 | 67 | 70 | 62 | 74 | 74 | 78 | 75 |
| T$_C$ (ppm/° C.) | | | | | | | | |
| −55° C. | −31 | +4 | +17 | −10 | 0 | −12 | −10 | −11 |
| 85° C. | −36 | +12 | +21 | +6 | +5 | 0 | 0 | 0 |
| 125° C. | −32 | +10 | +19 | +10 | +7 | −2 | +1 | +1 |
| RC (sec) (25° C.) | 0 | 5340 | 5586 | 141 | 93 | 63 | 44 | 84 |
| RC (sec) (85° C.) | 21 | 491 | 691 | 257 | 113 | 150 | 7 | 434 |
| RC (sec) (125° C.) | 1 | 42 | 101 | 24 | 21 | 17 | 0 | 18 |
| Breakdown Voltage (V/μm) | 56 | 106 | 94 | 58 | 82 | 74 | 53 | 67 |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A method of forming an electronic component comprising:
    a. applying particles of a dielectric material to a substrate and
    b. firing the substrate at a temperature sufficient to sinter the dielectric material, wherein the dielectric material comprises, prior to firing, about 12 to about 15 wt % Gd$_2$O$_3$, about 18 to about 22.5 wt % Nd$_2$O$_3$, about 26 to about 40 wt % TiO$_2$, about 12 to about 16 wt % BaO, about 0.05 to about 3 wt % CaO, about 0.05 to about 1.5 wt % SrO, about 0.05 to about 1.5 wt % SiO$_2$, about 0.05 to about 1 wt % Li$_2$O, about 2.5 to about 4.5 wt % Sm$_2$O$_3$, about 0.1 to about 5 wt % ZnO, about 0.05 to about 3 wt % B$_2$O$_3$, and about 0.05 to about 1.5 wt % LiF.

2. The method of claim 1 wherein the firing temperature is about 900° C. to about 1050° C.

3. The method of claim 1 wherein the firing is conducted in an atmosphere having an oxygen partial pressure of about $10^{-12}$ atm to about $10^{-8}$ atm.

4. The method of claim 1 wherein the dielectric material comprises, prior to firing, about 12.5 to about 14.5 wt % Gd$_2$O$_3$, about 19 to about 22 wt % Nd$_2$O$_3$, about 30 to about 39 wt % TiO$_2$, about 13 to about 15 wt % BaO, about 0.1 to about 2.5 wt % CaO, about 0.1 to about 1 wt % SrO, about 0.1 to about 1 wt % SiO$_2$, about 0.1 to about 0.8 wt % Li$_2$O, about 3 to about 4 wt % Sm$_2$O$_3$, about 0.2 to about 4.5 wt % ZnO, about 0.1 to about 2.5 wt % B$_2$O$_3$, and about 0.1 to about 1 wt % LiF.

5. The method of claim 1 wherein the dielectric material comprises, prior to firing, about 13 to about 14 wt % Gd$_2$O$_3$, about 20 to about 21 wt % Nd$_2$O$_3$, about 32 to about 38 wt % TiO$_2$, about 14 to about 15 wt % BaO, about 1 to about 2.5 wt % CaO, about 0.5 to about 1 wt % SrO, about 0.5 to about 1 wt % SiO$_2$, about 0.2 to about 0.5 wt % Li$_2$O, about 3.2 to about 3.8 wt % Sm$_2$O$_3$, about 1 to about 4 wt % ZnO, about 0.5 to about 2 wt % B$_2$O$_3$, and about 0.3 to about 0.9 wt % LiF.

6. A method of forming an electronic component comprising:
    a. alternately printing layers of an oxide-containing dielectric material and layers of a metal-containing electrode paste onto a substrate to form a laminar stack, wherein the dielectric material comprises, prior to firing, about 12 to about 15 wt % Gd$_2$O$_3$, about 18 to about 22.5 wt % Nd$_2$O$_3$, about 26 to about 40 wt % TiO$_2$, about 12 to about 16 wt % BaO, about 0.05 to about 3 wt % CaO, about 0.05 to about 1.5 wt % SrO, about 0.05 to about 1.5 wt % SiO$_2$, about 0.05 to about 1 wt % Li$_2$O, about 2.5 to about 4.5 wt % Sm$_2$O$_3$, about 0.1 to about 5 wt % ZnO, about 0.05 to about 3 wt % B$_2$O$_3$, and about 0.05 to about 1.5 wt % LiF,
    b. cutting the laminar stack to a predetermined shape,
    c. separating the stack from the substrate, and
    d. firing the stack to densify the metal in the electrode and sinter the oxides in the dielectric material.

7. The method of claim 6 wherein the layers of dielectric material, after firing, have a thickness of about 0.5 to about 50 microns.

8. The method of claim 6 wherein the firing is temperature is about 950° C. to about 1050° C.

9. The method of claim 6 wherein the metal-containing electrode paste comprises copper.

10. The method of claim 6 wherein the dielectric material comprises, prior to firing, about 12.5 to about 14.5 wt % Gd$_2$O$_3$, about 19 to about 22 wt % Nd$_2$O$_3$, about 30 to about 39 wt % TiO$_2$, about 13 to about 15 wt % BaO, about 0.1 to about 2.5 wt % CaO, about 0.1 to about 1 wt % SrO, about 0.1 to about 1 wt % SiO$_2$, about 0.1 to about 0.8 wt % Li$_2$O, about 3 to about 4 wt % Sm$_2$O$_3$, about 0.2 to about 4.5 wt % ZnO, about 0.1 to about 2.5 wt % B$_2$O$_3$, and about 0.1 to about 1 wt % LiF.

11. A multilayer ceramic chip capacitor comprising
    a. layers of a dielectric material alternately stacked with
    b. layers of an electrode material comprising a transition metal other than Ag, Au, Pd, or Pt, wherein the dielectric material comprises, prior to firing, about 12 to about 15 wt % Gd$_2$O$_3$, about 18 to about 22.5 wt % Nd$_2$O$_3$, about 26 to about 40 wt % TiO$_2$, about 12 to about 16 wt % BaO, about 0.05 to about 3 wt % CaO, about 0.05 to about 1.5 wt % SrO, about 0.05 to about 1.5 wt % $SiO_2$, about 0.05 to about 1 wt % $Li_2O$, about 2.5 to about 4.5 wt % $Sm_2O_3$, about 0.1 to about 5 wt % ZnO, about 0.05 to about 3 wt % $B_2O_3$, and about 0.05 to about 1.5 wt % LiF.

12. The multilayer ceramic chip capacitor of claim 11 wherein the electrode material comprises copper.

13. The multilayer ceramic chip capacitor of claim 11 wherein the dielectric material comprises, prior to firing, about 13 to about 14 wt % $Gd_2O_3$, about 20 to about 21 wt % $Nd_2O_3$, about 32 to about 38 wt % $TiO_2$, about 14 to about 15 wt % BaO, about 1 to about 2.5 wt % CaO, about 0.5 to about 1 wt % SrO, about 0.5 to about 1 wt % $SiO_2$, about 0.2 to about 0.5 wt % $Li_2O$, about 3.2 to about 3.8 wt % $Sm_2O_3$, about 1 to about 4 wt % ZnO, about 0.5 to about 2 wt % $B_2O_3$, and about 0.3 to about 0.9 wt % LiF.

14. The multilayer ceramic chip capacitor of claim 13 where the electrode material comprises copper.

15. A dielectric composition used to make electronic components wherein the dielectric composition comprises about 12 to about 15 wt % $Gd_2O_3$, about 18 to about 22.5 wt % $Nd_2O_3$, about 26 to about 40 wt % $TiO_2$, about 12 to about 16 wt % BaO, about 0.05 to about 3 wt % CaO, about 0.05 to about 1.5 wt % SrO, about 0.05 to about 1.5 wt % $SiO_2$, about 0.05 to about 1 wt % $Li_2O$, about 2.5 to about 4.5 wt % $Sm_2O_3$, about 0.1 to about 5 wt % ZnO, about 0.05 to about 3 wt % $B_2O_3$, and about 0.05 to about 1.5 wt % LiF.

16. The composition of claim 15 wherein the composition is lead-free and cadmium-free.

17. An electronic device comprising a multilayer chip capacitor comprising a dielectric layer comprising a composite oxide comprising gadolinium (Gd), neodymium (Nd), titanium (Ti), barium (Ba), calcium (Ca), strontium (Sr), silicon (Si), lithium (Li), tin (Sn), zinc (Zn), boron (B), and fluorine (F).

18. The electronic device of claim 17 further comprising an electrode layer comprising a conductive metal other than silver, gold, palladium or platinum.

19. The electronic device of claim 17 further comprising an electrode layer comprising copper.

* * * * *